Nov. 14, 1961  A. H. SANBORN  3,008,398
CAMERA FOCUSING DEVICE
Filed Nov. 14, 1958  2 Sheets-Sheet 1
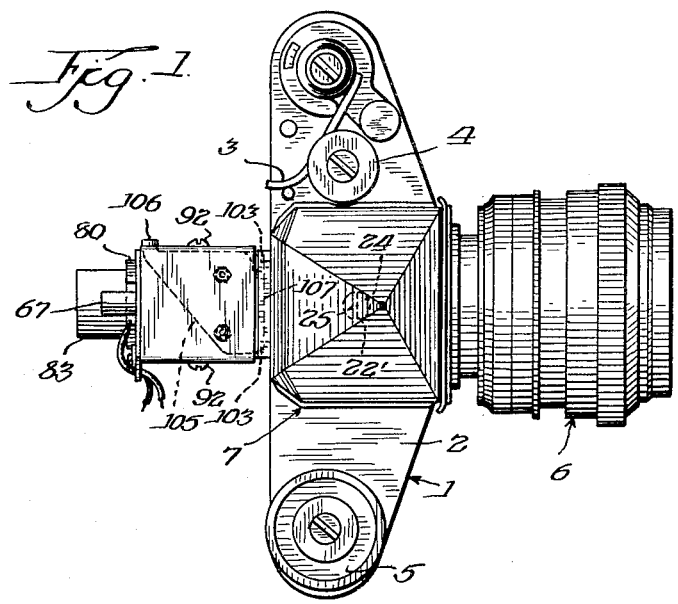
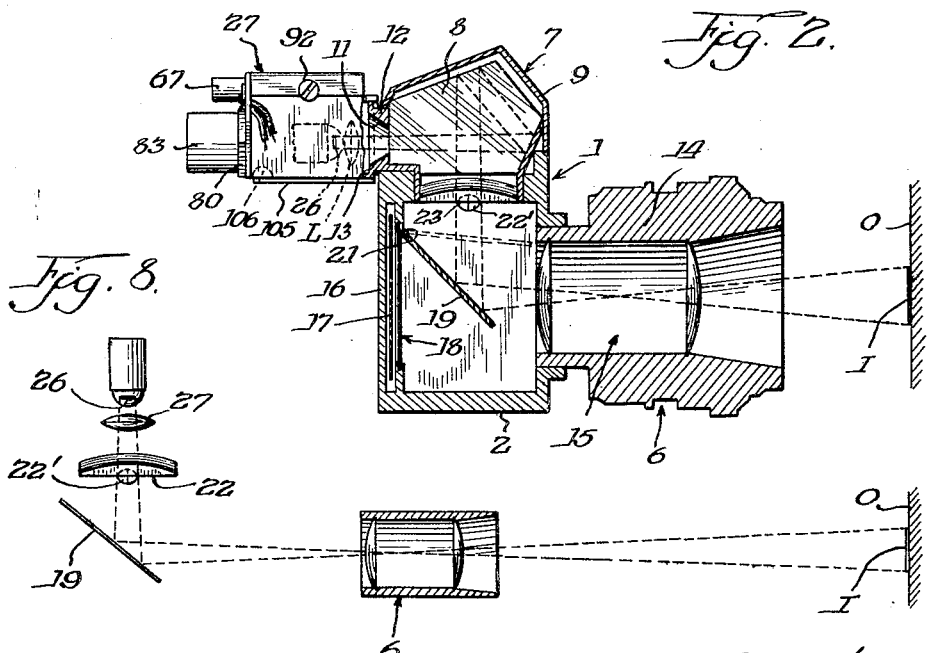
Inventor.
Arthur Hoit Sanborn.
By Lee & Lee Attys.

Nov. 14, 1961  A. H. SANBORN  3,008,398
CAMERA FOCUSING DEVICE
Filed Nov. 14, 1958  2 Sheets-Sheet 2
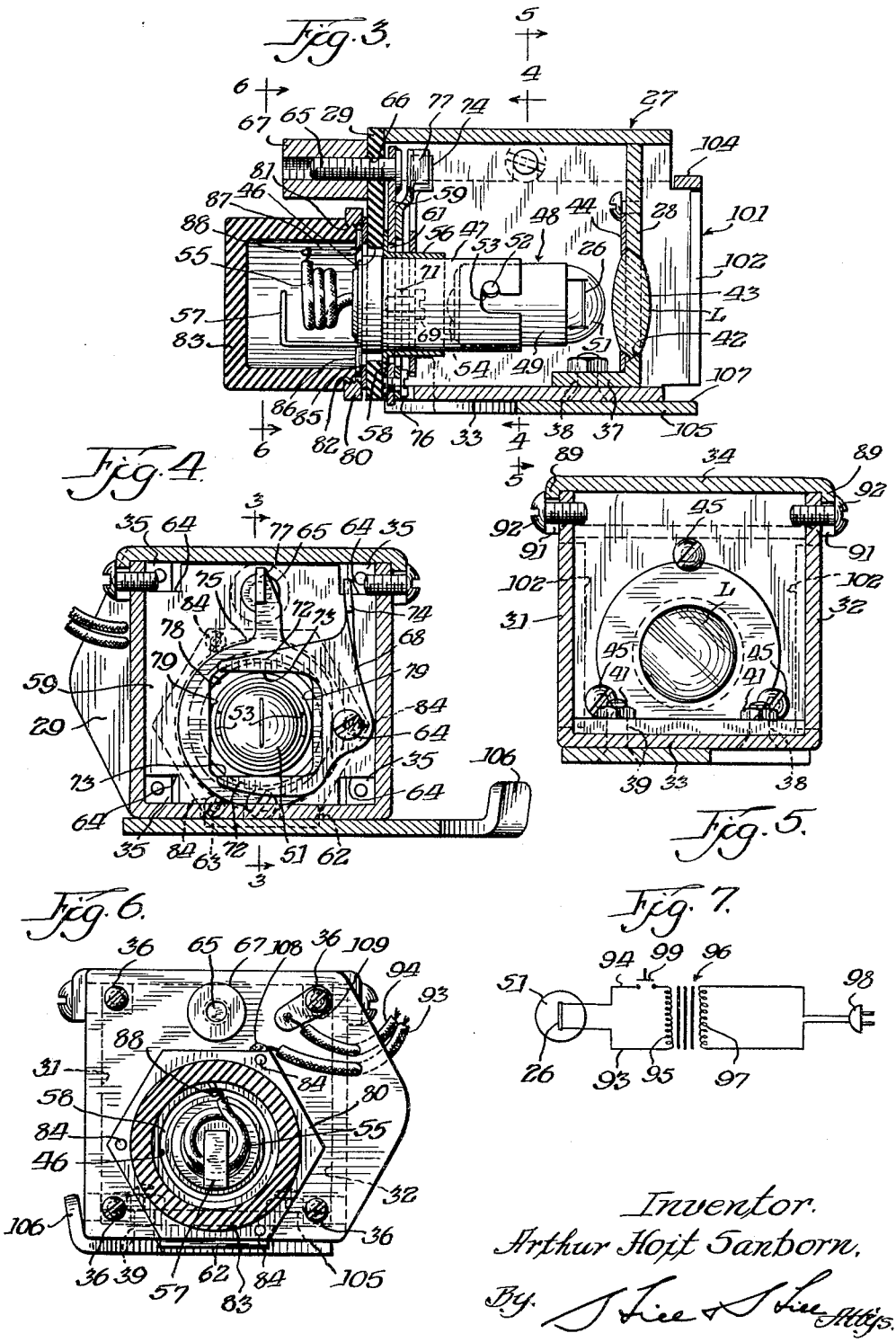
Inventor.
Arthur Hoyt Sanborn.
By
Attys.

United States Patent Office 3,008,398
Patented Nov. 14, 1961

3,008,398
CAMERA FOCUSING DEVICE
Arthur Hoit Sanborn, Chicago, Ill., assignor to
Gregory B. Sullivan, Chicago, Ill.
Filed Nov. 14, 1958, Ser. No. 774,024
4 Claims. (Cl. 95—44)

The invention relates generally to photographic apparatus and more particularly to novel method and apparatus for focusing cameras and the like.

Certain types of photography, due to the nature of the subject matter involved, present difficulties in accurately focusing on the object to be photographed as well as in determining the exact field to be photographed. One example of such type of photography is the taking of medical pictures of operations and the like which present numerous difficulties in the taking thereof. Pictures of this type are usually shot at relatively short focus distances and usually at fast lens speeds whereby the depth of field is very shallow, the problem being further aggravated by the fact that the portions of the body to be photographed, as for example, the throat or an organ etc. are not planar. Obviously, under such conditions, it is exceedingly difficult to peer through a range or view finder, adjust the camera and snap the picture.

While the present invention may be used with various cameras of different makes and designs, the invention is illustrated in the drawings with a single lens reflex camera of the through-the-lens type such as an "Exakta" utilizing a prismatic viewer instead of the usual ground glass hood. Cameras of this type also may be provided with a range finder glass in connection with the prism structure by means of which a split image may be derived, the two halves of the image being in registry if the camera is focused at the proper distance between the camera and the object. In the "Exakta" camera, the range finder utilizes oppositely inclined prism sections in the range finder glass.

The present invention has among its objects the utilization of a novel method of focusing a camera such as that described in connection with the taking of short range photographs, as for example, medical pictures, whereby very accurate focusing may be achieved without the operator viewing the object through the viewing system of the camera, and at the same time, if desired, without adjustment of the camera mechanism.

Another object of the invention is the production of a novel apparatus for practicing the method which may be readily applied to a camera for which it is designed without modification of the latter.

Another object of the invention is the production of such a device which also may provide an indication of the center and extent of the picture field so that the operator may at all times accurately center the desired field.

A further object of the invention is the production of an apparatus which, in use on a through-the-lens reflex camera, eliminates mechanical errors in adjustment in the focusing operation as the same lens system is employed for both focusing and taking of the pictures.

A further object of the invention is the production of such an apparatus which is extremely simple in construction and foolproof in operation.

Many other objects and advantages of the present invention will be obvious to those skilled in the art from the disclosure herein given.

In the drawings, wherein like reference characters indicate like or corresponding parts:

FIG. 1 is a top plan view of a camera illustrating the application of a focusing device embodying the present invention mounted thereon;

FIG. 2 is a transverse sectional view through the camera illustrated in FIG. 1 illustrating diagrammatically the operation of the present invention;

FIG. 3 is a longitudinal sectional view taken approximately on the line 3—3 of FIG. 4;

FIG. 4 is a transverse sectional view taken approximately on the line 4—4 of FIG. 3;

FIG. 5 is a transverse sectional view taken approximately on the line 5—5 of FIG. 3;

FIG. 6 is a transverse sectional view taken on the line 6—6 of FIG. 3;

FIG. 7 is a diagrammatic figure of a wiring diagram of one embodiment of the invention; and FIG. 8 is a diagrammatic view generally similar to FIG. 2 illustrating a modified form of the invention.

Referring to the drawings and more particularly to FIGS. 1 and 2, the reference numeral 1 indicates generally a camera structure such as an "Exakta" having a camera body 2, the top of which is provided with a film advance and shutter cocking lever 3 and knobs 4 and 5 relating to the shutter setting mechanism. The reference numeral 6 indicates generally a lens structure which may be detachable from the body 2 whereby different lenses may be employed with the camera. On the top of the camera of body 2 is a prism assembly indicated by the numeral 7, which in the case of the "Exakta" cameras is termed "pentaprism" and which may be constructed as a detachable member. The pentaprism assembly comprises a prism assembly 8 enclosed in a suitable housing 9 which is provided with a viewing window 11 therein formed in a member 12 which extends from the housing 9 and is provided with a peripheral flange 13. The lens assembly 6 generally comprises a suitable barrel 14 and a diagrammatically illustrated lens structure designated by the numeral 15, the lens 6 including a suitable diaphragm and means for adjusting the same.

Positioned on the optical axis of the lens 6 adjacent the rear wall 16 of the body 2 is guide means for the film 17 and a suitable shutter mechanism indicated generally by the numeral 18 interposed between the film and the lens. Also interposed between the film and lens is a movable mirror 19 pivoted at its upper edge 21, whereby the mirror is movable from the position such as that illustrated in FIG. 2 to an upper position as indicated in dotted lines in such figure. When in the position illustrated in FIG. 2 the mirror 19 is operative to intercept the photographic image and reflect it upwardly into the prism assembly 8 in which it is reflected from various sides of the prism as indicated in dotted lines and ultimately through the window 11. Thus the operator of the camera may place his eye to the window 11 and view the field taken in by the lens 6. As the latter is also utilized in taking the picture on the film 17, the viewer will see the exact field which will ultimately be reproduced on the film. Likewise the substitution of a different lens will not affect this operation. The camera is so designed that upon actuation of the shutter releasing button, the mirror 19 will first pivot upwardly to the position indicated in dotted lines, thus uncovering the shutter 18 and the film 17 upon shutter actuation to permit film exposure. Current cameras of this type often embody an automatic diaphragm assembly which may be pre-set to any desired aperture, the diaphragm remaining wide open for viewing operations and automatically closing to the pre-set stop at the time the shutter is actuated.

To facilitate focusing of the camera while viewing the field through the eye piece 11, the "Exakta" type camera may be provided with a range finder glass 22 which is interposed in the path of light rays from the mirror 19 to the prism assembly 8, such glass in the "Exakta" cameras being supported by the housing 9 of the pentaprism assembly 7, the latter normally containing a glass having a perfectly planar bottom surface 23, while the glass 22 illustrated has a small generally spherical shaped prism assembly 22' cemented into a hemispherical recess in the lower face 23, and comprising two semi-circular sectors 24 and 25 which are inclined in opposite directions with respect to an axis extending normal to their line of intersection. The construction is such that when the lens 6 is properly adjusted to bring the image into proper focus on the film 17, for the particular distance which exists between the camera and the object being photographed, such image will be properly focused on the glass 22 when reflected by the mirror 19. Thus, if the camera is in proper focus, the prisms 24 and 25 will have no effect on vertical lines in the image as viewed through the window 11, but if the camera is not properly focused, the prism assembly will split that portion of the image passing through it so that a vertical line as viewed in the portion 24 will be laterally offset from the corresponding line viewed in the portion 25. If the distance is shorter than that for which the camera is set, the offsetting of the respective image will be to respective sides of the center, and if the distance is longer, the offsetting of the respective images will be at reverse sides of center. Thus the operator may readily focus the camera by adjusting the same until the image passing through the portion 24 is in proper registry with the image passing through the portion 25.

The construction thus far is generally similar to current types of cameras, the details of construction of which form no part of the present invention.

The present invention contemplates the use of the optical system of the camera 1, comprising the lens 6, mirror 19, glass 22 and prism assembly 8 to project an image on the object to be photographed, such image being operative to provide an indication when the distance between the camera and object, and the focus setting of the camera are correctly correlated, thus providing visual means for determining when such correlation has been achieved.

An incandescent filament 26 may be positioned adjacent the window 11, a suitable projection lens L being interposed between the filament and the window whereby the light rays from the filament are projected on the prism assembly 8 at the window 11 and transmitted through the assembly to the mirror 19 and from there to the lens 15 from which it will be projected onto the object O as illustrated in FIG. 2. Obviously, as the light rays are traversing the same path as that by which the image of the object is normally viewed, but merely travelling in the opposite direction through the system, if the camera focus is not adjusted for the distance between the camera and the object O, the image I will be divided vertically into an upper and lower section, the image of each section being laterally offset so that they do not form a single line, but rather two lines offset from each other. However, if the camera is properly focused, the projected image will appear as a single straight line.

Thus in practicing the method, the operator merely observes the image which is projected on the object and adjusts the focus relation accordingly. Such adjustment may be either by moving the camera closer or farther from the object whereby the distance from the camera to the object corresponds with the focusing adjustment that has been set on the camera, or the operator may keep the distance between the camera and object constant and adjust the camera focus to the exact distance between the camera and the object. In either event, it is unnecessary to observe through the view finder, and as the image may be centered in the optical system, the projected image on the object will indicate the center of the photographic field subsequently appearing on the film.

FIGS. 3 through 7 illustrate details of a particular embodiment of the invention illustrated, the device comprising a housing indicated generally by the numeral 27 having a front wall 28, a rear wall 29, oppositely disposed side walls 31 and 32, a bottom wall 33 and a top cover member 34. The side walls 31 and 32 and bottom 33 are illustrated as being constructed from a single piece of material bent to the desired shape and provided adjacent the rear wall 29 with ears or lugs 35 adapted to be positioned adjacent the inner face of the rear wall 29 and constructed to receive mounting screws 36 passing through the rear wall and threaded into the lugs 35.

The front wall 28 is provided with an inwardly directed flange 37 by means of which the wall is secured to the bottom wall 33 by screws 38 and 39 which are threaded into the flange 37 and locked into position by nuts 41.

As illustrated in FIGS. 3 and 5, the front wall 28 is provided with an opening 42 in which is positioned the projection lens L, having beveled edges 43, which is retained in operative position by a retaining ring 44, operatively secured to the wall 28 by a plurality of screws 45 threaded into the wall 28 and having their heads overlying and bearing upon the plate 44 to clamp the latter to the wall 28. As will be apparent from a reference to FIG. 3, the beveled peripheral edges 43 of the lens L are adapted to engage complementary edges of the wall 28 and ring 44, whereby the lens is clamped in operative position.

The rear wall 29 is constructed of electrical insulating material and is provided with an opening 46 therein in which is positioned the end portion of a lamp socket 47 adapted to receive and support a lamp bulb 48 having a base 49 and transparent bulb portion 51 through which the rays of light from the filament 26 may pass, the filament being disposed substantially directly behind the lens L as illustrated in FIG. 3.

The socket 47 may be of standard construction and in like manner the base 49 of the bulb 48 may be of generally standard bayonet type, having oppositely disposed pins 52, only one of which is illustrated in FIG. 3, adapted to be positioned and locked in L-shaped slots 53. The base 49 is provided at its rear end with a central terminal 54 which is adapted to be operatively connected to a conductor 55, such socket construction usually employing an insulated contact which is spring biased to engage the contact 54 of the bulb when the latter is inserted in the socket.

The socket 47 is operatively supported in a sleeve 56, the construction illustrated utilizing a frictional fit between the sleeve 56 and socket 47 whereby the two will normally be supported in rigid relationship under normal conditions, but if desired axial adjustment of the socket with respect to the sleeve may be effected by exerting force in the proper direction on the socket. To facilitate such adjustment, the socket may be provided with an L-shaped handle 57 positioned adjacent the rear end of the socket and secured thereto. The sleeve 56 is provided with an annular flange 58 which is adapted to abut against the inner face of the rear wall 29 and be secured in operative position with respect thereto by a retaining plate 59 having an opening 61 therein through which the sleeve 56 extends, the diameter of the opening 61 being less than the external diameter of the flange 58, so that the latter may be clamped between the adjacent face of the wall 29 and adjacent face of the plate 59. To achieve this result, the plate 59 may be provided with a tongue 62 adapted to be positioned in a slot 63 in the bottom wall 33, the plate being notched at its corners as indicated at 64, so that the action of the plate will not be restricted by the ears or projections 35 on the side walls 31 and 32. Clamping action of the flange 58 is effected by a screw 65, illustrated as being rigidly secured to the plate, and extending through an opening 66 in the wall 29, a cooperable knob 67 being threaded on the free end of the screw 65 and adapted to bear on the outer face of the wall 29 so that by turning the knob 67 down on the screw 66, the latter will urge the adjacent portion of the plate 59 toward the wall 29 to clamp the flange 58 therebetween.

It will be apparent that by operatively relieving clamping pressure of the plate 59 on the flange 58 of the sleeve 56, the axis of the latter may be shifted both horizontally and vertically as viewed in FIG. 4, the openings 46 and 61 being sufficiently larger in diameter than the socket 47 and sleeve 56 to permit a limited adjustment of the bulb 48 in directions transverse to its axis. At the same time, the bulb may be moved toward or away from the lens L or twisted about its axis to vertically position the filament as illustrated in FIG. 4.

While such transverse adjustment of the bulb could be effected by suitable adjustment of the handle 57, the embodiment of the invention illustrated provides levers for adjusting the bulb both in a horizontal and a vertical direction. Referring to FIGS. 3 and 4, the bulb is adapted to be adjusted in a vertical direction by a lever 68 pivoted to the plate 59 by a screw 69 passing through the lever and a spacing collar 71 interposed between the lever and the plate 59. The lever 68 is provided with a pair of spaced sleeve engaging portions 72 having substantially parallel opposed edges 73 adapted to engage the sleeve 56 so that upon loosening of the plate 59 with respect to the sleeve, the pivotal movement of the lever 68 will be operative to shift the sleeve 56 and thus the bulb 48 in a vertical direction, such actuation of the lever 68 being facilitated by the provision of a handle 74 extending therefrom.

In like manner, horizontal adjustment of the bulb may be effected by means of an adjusting lever 75 which is pivoted at its lower end by means of a screw 76 to the plate 59, the screw 76 passing through the lever and threaded into the plate similar to the screw 69. The lever 75 likewise is provided at its opposite end with a handle 77 by means of which the lever may be pivoted about the axis of the screw 76 and as illustrated in FIG. 4, the lever 75 is provided with an opening 78 therein having substantially vertical side edges 79 adapted to bear on the sleeve 56 so that such pivotal movement of the lever will effect a horizontal adjustment of the lamp 48.

Secured to the outer face of the wall 29 is an annular member 80, the outer edges of which are in the form of a hexagon, and provided with a threaded bore 81 therein adapted to receive the threaded end portion 82 of a hollow, generally cylindrical shaped cap member 83, illustrated as being constructed of plastic or other suitable material. The annular member 80 is illustrated as being secured to the wall 29 by a plurality of flat headed screws 84 countersunk into the inner face of the wall 29 and threaded into the member 80, the latter clamping an annular washer 85 therebetween.

The conductor 55 is adapted to be operatively connected to the annular member 80 through a spring clip indicated by the numeral 86 which is of generally C-shape, having one end portion turned outwardly as indicated at 87 to which the conductor 55 may be secured as indicated at 88, the clip 86 being resilient and having a normal expanded diameter greater than that of the bore 81 of the annular member 80 so that the spring may be peripherally contracted and inserted into the member 80, seating upon the annular washer 85 as clearly illustrated in FIG. 3, the cap member 83 being operative to maintain the clip in firm engagement with the washer 85.

As illustrated in FIGS. 3 and 5, the cover 34 may be provided with down turned flanges 89 adapted to abut the side walls 31 and 32 and provided with slots 91 through which screws 92, threaded into the side walls 7 may extend. Thus by partially unscrewing the screws 92, the cover 34 may be lifted off of the side walls 31 and 32 to provide access to the interior of the housing.

The filament 26 may be illuminated by current from any suitable power source, either portable or an A.C. light line, FIG. 7 illustrating a circuit for the latter arrangement wherein the filament 26 is adapted to be operatively connected by conductors 93 and 94 to the opposite ends of a secondary winding 95 of a transformer 96, the latter having a primary winding 97 adapted to be operatively connected to an A.C. line through a plug 98. To control the operation of the filament an on and off switch 99 may be inserted in the circuit, that illustrated being in series with the filament 26 and secondary 95 of the transformer. Thus the filament 26 may be actuated only when desired by closure of the switch 99.

The housing 27 is also provided with suitable means indicated generally by the numeral 101 for supporting the device on the camera 1. The details of the mounting structure may vary with the particular construction of that portion of the camera to which the device is to be mounted.

In the particular camera structure illustrated, in which the member 12 having the viewing opening 11 therein is provided with a peripheral flange 13, the mounting structure 101 may comprise a pair of inwardly directed opposed flanges 102 extending vertically along the adjacent edges of the side walls 31 and 32, the distance between the side walls 31 and 32 being slightly larger than the corresponding distance between the vertically extending flange portions 103 of the member 12 so that the flanges 102 may engage the inner faces of the vertical flanges 103 on the camera. The housing 27 may be engaged with the camera by positioning the housing above the member 12 and moving it downwardly thereon, the flanges 102 being positioned behind the flanges 103. Downward movement of the housing may be restricted by a cross member 104 extending above the flanges 102 and transversely across the housing, the member 104 being proportioned to engage the top edge of the flange 13 with the lens L aligned with the window 11.

Undesired removal of the housing from the flange 13 may be prevented by suitable means, as for example, a latch member 105 which as illustrated in FIG. 1 is generally triangular shaped, having a handle portion 106. The latch member 105 is illustrated as being pivotally secured to the housing by the screw 39 which is of a length to pass through the member 105, wall 33, and thread into the flange 37, the screw being locked in position by the nut 41. Thus by manipulation of the handle 106, outwardly away from the adjacent wall 31, the front edge portion of the member 105 may be rotated to a position where it will not interfere with the mounting of the housing 27 on the flanges 13, but when the handle 106 is brought to adjacent the side wall 31 as illustrated in FIGS. 1 and 6, the portion 107 will underlie the adjacent bottom portion of the flange 13, thereby preventing withdrawal of the housing from the camera.

Referring to FIG. 6, it will be noted that the conductors 93 and 94 may be operatively connected to the filament 26 through the annular member 80 and the housing structure, the conductor 93 being illustrated as being secured to the annular member 80 as indicated at 108, while the conductor 94 may be operatively connected to the housing by a terminal 109 which is secured by one of the screws 35 to the wall 32, the socket 47 being operatively connected to the wall 32 by the sleeve 56, and plate 59, the tongue 62 thereof being urged by the screw 65 and knob 62 into engagement with the adjacent portion of the bottom 33.

The operation of the structure described is as follows: The camera may be loaded in the usual way and set at the desired diaphragm stop and shutter speed for the particular film, illumination, etc. The filament 26 is actuated and the camera positioned for taking the photograph. The image of the filament will be projected through the camera lens system and appear upon the surface of the object, and if the camera is positioned at the right distance for the particular focus setting of the lens structure, the portions of the image passing through the range finder prisms will be in vertical alignment so that the operator may thereupon take the picture. If the image is divided into two offset portions, indicating that the camera is not at the proper distance from the object for the camera setting, either of two methods of procedure may be employed, one being to move the camera toward or away from the object as required to bring the two portions of the image into alignment, and thus correct the distance between the camera and object to the particular setting of the camera lens.

The second procedure would be to maintain the camera at its original distance from the object and adjust the lens to bring the two portions of the image into registry, at which point the camera will be properly adjusted for the particular distance between it and the object. Thus in either event, the operator effects an adjustment of the relation between the camera and object and the setting of the focus adjustment of the camera to bring the projected image on the object into proper focus.

In adjusting the filament 26 by manipulation of the socket 47, the bulb may be moved axially toward or away from the lens 43 to provide a desired image of the filament at the viewing window 11, while the horizontal and vertical adjustment as well as orientation of the filament of the lamp may be effected through the levers 68 and 75 and handle 57. Such adjustment may be readily effected by projecting an image on a flat surface, which will result in the projection of a relatively faint disk of light corresponding to the circular shape of the portions 24 and 25 of the range finder prisms, so that the image of the filament 26 may be readily centered with respect to such disk. As the vertical adjustment is relatively insensitive compared with the adjustment horizontally, the lever 68 may be eliminated in most cases, and vertical adjustment effected by movement of the sleeve 56 through the socket 47 or handle 57, or in some cases, merely by the handle 57.

While the invention has been illustrated and described in connection with a camera utilizing a prismatic view finder, in some cases it may be desirable to utilize the invention in connection with a through-the-lens reflex camera which does not embody a prismatic view finder. In such case the image of the filament could be suitably projected directly on the glass 22 which, in the absence of the prism arrangement, may comprise the ground glass upon which the image of the object is viewed. FIG. 8 illustrates such a structure wherein the filament 26 is projected by the projecting lens L, directly on the glass 22, the general operation of the structure otherwise being the same as that heretofore described. In certain applications the light passing through the system may be utilized to project a rectangularly shaped area of illumination on the object corresponding to the field to be photographed so that the user can visually determine such field.

It will be appreciated from the above description that the present method and apparatus illustrated is very efficient in use in connection with medical photography and similar uses, wherein focusing becomes difficult due to the nature of the subject matter involved and the conditions under which the photographs must be taken.

Likewise, the particular structure shown and described provides a very simple, yet highly efficient structure that may be applied to a camera, such as that illustrated, without modification of the camera structure and removed therefrom for normal camera operation.

Having thus described my invention, it will be obvious to those skilled in the art that various modifications may be made in my invention, hence I do not wish to be understood as limiting myself to the exact form, arrangement and combination of parts shown and described, or uses mentioned.

What I claim as new and desire to secure by Letters Patent is:

1. In a camera focusing device, the combination of a housing structure, a lamp bulb having a straight line filament portion, means for supporting said lamp bulb in the housing, the latter having an opening therein through which the light rays from said filament may pass, a projection lens structure interposed in the path of such light rays, means for mounting said housing on mounting means of a camera with light rays from said filament entering an optical system of the camera for projection thereby on an object to be photographer, and means for splitting the filament image entering the camera optical system whereby a split image of the filament is projected which will be aligned when the camera optical system is properly focused, said housing structure comprising a front wall, a rear wall, oppositely disposed side walls, a bottom wall and a top cover member, said rear wall being of an electrical insulating material, said front wall having an opening therein, said projection lens structure being positioned in said opening, a lens-retaining disc secured to said front wall and operative to clamp the lens between it and the front wall, said rear wall having an opening therein, a lamp socket positioned in said opening, said lamp bulb being carried by said socket operative to send light rays through said lens structure, a socket supporting sleeve in which said socket is frictionally held, said sleeve having an external flange thereon having the adjacent face abutting the inner face of said rear wall, a retaining plate positioned adjacent the inner face of said rear wall having an opening therein through which said sleeve extends with the flange on said sleeve positioned between said rear wall and said retaining plate, a screw rigidly secured to said plate and extending through the rear wall, a knob threaded on the free end of said screw and bearing against the outer face of said rear wall, said screw and knob being operative to draw the plate toward the rear wall to apply a clamping force on the flange of said sleeve to maintain the same in a fixed relation with respect thereto, a vertical adjusting lever pivotally supported by said plate and having sleeve-engaging portions, operative to move the sleeve on a generally vertical axis when said lever is moved about its pivotal connection, a horizontal adjusting lever pivotally supported by said plate and having sleeve-engaging portions operative to move the sleeve on a generally horizontal axis when such lever is moved about its pivotal connection.

2. In a camera focusing device, the combination of a housing structure, a lamp bulb having a straight line filament portion, means for supporting said lamp bulb in the housing, the latter having an opening therein through which the light rays from said filament may pass, a projection lens structure interposed in the path of such light rays, means for mounting said housing on mounting means of a camera with light rays from said filament entering an optical system of the camera for projection thereby on an object to be photographed, and means for splitting the filament image entering the camera optical system whereby a split image of the filament is projected which will be aligned when the camera optical system is properly focused, said housing structure comprising a front wall, a rear wall, oppositely disposed side walls, a bottom wall and a top cover member, said rear wall being of an electrical insulating material, said front wall having an opening therein, said projection lens structure being positioned in said opening, a lamp socket positioned in said opening, means frictionally supporting said socket for adjustment horizontally, the front edge of said side walls having respective inwardly directed opposed flanges engageable with mounting flanges on such camera, a cross member extending across the housing and positioned above said first mentioned flanges adapted to limit downward movement of the housing on such camera flanges, a latching lever pivotally mounted on said housing and extending along the bottom wall thereof, said latching lever being movable from a position below said mounting flanges of such camera to retain the housing thereon, to a position operative to release said mounting means and permit removal of the housing therefrom, an annular-shaped threaded member mounted on the rear wall at the outer face thereof concentric with the opening therein, a generally C-shaped spring clip adapted to engage said annular member, a conductor operatively connecting one side of the filament of said light bulb to said clip, the other side of said filament being operatively connected to said socket, a handle connected to said socket and by means of which axial adjustment of the socket may be effected, and a cap member threaded into said annular member and enclosing said handle, clip, conductor and adjacent end of said socket, and conductor means for operatively connecting a power source to said annular member and said socket.

3. In a camera focusing device, the combination of a housing structure, a lamp bulb having a straight line filament portion, means for supporting said lamp bulb in the housing, the latter having an opening therein through which the light rays from said filament may pass, a projection lens structure interposed in the path of such light rays, means for mounting said housing on mounting means of a camera with light rays from said filament entering an optical system of the camera for projection thereby on an object to be photographed, and means for splitting the filament image entering the camera optical system whereby a split image of the filament is projected which will be aligned when the camera optical system is properly focused, said housing structure comprising a front wall, a rear wall, oppositely disposed side walls, a bottom wall and a top cover member, said front wall having an opening therein, said projection lens structure being positioned in said opening, a lamp socket positioned in said housing, said lamp being carried by said socket operative to send light rays through said lens structure, a socket supporting sleeve in which said socket is frictionally held, said sleeve having an external flange thereon having the adjacent face abutting the inner face of said rear wall, a retaining plate positioned adjacent the inner face of said rear wall having an opening therein through which said sleeve extends with the flange on said sleeve positioned between said rear wall and said retaining plate, means operative to draw the plate toward the rear wall to apply a clamping force on the flange of said sleeve to maintain the same in a fixed relation with respect thereto, means on said housing engageable with mounting means on such camera for supporting the housing thereon, a latching lever pivotally mounted on said housing and extending along the bottom wall thereof, said latching lever being movable from a position cooperable with such mounting means of the camera to retain the housing thereon, to a position operative to release said mounting means and permit removal of the housing therefrom, an annular-shaped threaded member mounted on the rear wall at the outer face thereof concentric with the opening therein, a generally C-shaped spring clip adapted to engage said annular member, a conductor operatively connecting one side of the filament of said light bulb to said clip, the other side of said filament being operatively connected to said socket, a handle connected to said socket and by means of which axial adjustment of the socket may be effected, and a cap member threaded into said annular member and enclosing said handle, clip, conductor and adjacent end of said socket, and conductor means for operatively connecting a power source to said annular member and said socket.

4. In a camera focusing device, the combination of a housing structure, a lamp bulb having a straight line filament portion, means for supporting said lamp bulb in the housing, the latter having an opening therein through which the light rays from said fialment may pass, a projection lens structure interposed in the path of such light rays, means for mounting said housing on mounting means of a camera with light rays from said filament entering an optical system of the camera for projection thereby on an object to be photographed, and means for splitting the filament image entering the camera optical system whereby a split image of the filament is projected which will be aligned when the camera optical system is properly focused, said housing structure comprising a front wall, a rear wall, oppositely disposed side walls, a bottom wall and a top cover member, said rear wall being of an electrical insulating material, said front wall having an opening therein, said projection lens structure being positioned in said opening, a lens retaining disc secured to said front wall and operative to clamp the lens between it and the front wall, said rear wall having an opening therein, a lamp socket positioned in said opening, said lamp bulb being carried by said socket operative to send light rays through said lens structure, a socket supporting sleeve in which said socket is frictionally held, said sleeve having an external flange thereon having the adjacent face abutting the inner face of said rear wall, a retaining plate positioned adjacent the inner face of said rear wall having an opening therein through which said sleeve extends with the flange on said sleeve positioned between said rear wall and said retaining plate, a screw rigidly secured to said plate and extending through the rear wall, a knob threaded on the free end of said screw and bearing against the outer face of said rear wall, said screw and knob being operative to draw the plate toward the rear wall to apply a clamping force on the flange of said sleeve to maintain the same in a fixed relation with respect thereto, a vertical adjusting lever pivotally supported by said plate and having sleeve-engaging portions, operative to move the sleeve on a generally vertical axis when said lever is moved about its pivotal connection, a horizontal adjusting lever pivotally supported by said plate and having sleeve-engaging portions, operative to move the sleeve on a generally vertical axis when such lever is moved about its pivotal connection, said adjusting levers being operable to facilitate adjustment of the filament image with respect to said split image range finder and the optical system of the camera, the front edge of said side walls having respective inwardly directed opposed flanges engageable with mounting flanges on such camera, a cross member extending across the housing and positioned above said first mentioned flanges adapted to limit downward movement of the housing on such camera flanges, a latching lever pivotally mounted on said housing and extending along the bottom wall thereof, said latching lever being movable from a position below said mounting flanges of such camera to retain the housing thereon, to a position operative to release said mounting means and permit removal of the housing therefrom, an annular-shaped threaded member mounted on the rear wall at the outer face thereof concentric with the opening therein, a generally C-shaped spring clip adapted to engage said annular member, a conductor operatively connecting one side of the filament of said light bulb to said clip, the other side of said filament being operatively connected to said socket, a handle connected to said socket and by means of which axial adjustment of the socket may be effected, and a cap member threaded into said annular member and enclosing said handle, clip, conductor and adjacent end of said socket, and conductor means for operatively connecting a power source to said annular member and said socket.

References Cited in the file of this patent

UNITED STATES PATENTS

| | | |
|---|---|---|
| 2,282,045 | Fleischer | May 5, 1942 |
| 2,327,859 | Bolsey | Aug. 24, 1943 |
| 2,341,410 | Mihalyi | Feb. 8, 1944 |
| 2,721,929 | Schwartz et al. | Oct. 25, 1955 |
| 2,760,048 | Schulte | Aug. 21, 1956 |

FOREIGN PATENTS

| | | |
|---|---|---|
| 723,202 | Great Britain | Feb. 2, 1955 |
| 933,132 | Germany | Sept. 15, 1955 |